United States Patent [19]

Wolford et al.

[11] 4,342,538

[45] Aug. 3, 1982

[54] FACE-TYPE SHAFT SEAL

[75] Inventors: Dale E. Wolford, Ashland; George S. York, Mansfield, both of Ohio

[73] Assignee: The Gorman-Rupp Company, Mansfield, Ohio

[21] Appl. No.: 155,405

[22] Filed: Jun. 2, 1980

[51] Int. Cl.³ ............................................. F04D 29/10
[52] U.S. Cl. .................................... 415/170 A; 277/82
[58] Field of Search .......... 415/170 A, 170 R, 173 A, 415/173 R; 277/82, 85, 88, 89, 81 R, 92, 135

[56] References Cited

U.S. PATENT DOCUMENTS

| | | | |
|---|---|---|---|
| 2,467,239 | 4/1949 | Snyder | 277/89 |
| 2,994,547 | 8/1961 | Dolhun et al. | 277/89 |
| 3,306,223 | 2/1967 | Liebig | 415/173 A X |
| 3,367,274 | 2/1968 | Lombard | 415/170 A X |
| 3,447,810 | 6/1969 | Porter | 277/85 |
| 3,457,870 | 7/1969 | Sleeter | 415/173 R |
| 3,567,230 | 3/1971 | Gits | 277/89 |
| 3,632,220 | 1/1972 | Lansinger et al. | 415/170 A X |
| 3,914,072 | 10/1975 | Rowley et al. | 415/170 A X |
| 4,095,807 | 6/1978 | Jandt et al. | 277/40 |

FOREIGN PATENT DOCUMENTS 680004 2/1964 Canada ........................... 415/170 A

*Primary Examiner*—Everette A. Powell, Jr.
*Attorney, Agent, or Firm*—Watts, Hoffmann, Fisher & Heinke Co.

[57] ABSTRACT

A face-type shaft seal characterized by a protective boot surrounding the rotating seal assembly inside of the coil spring, and a viscous material filling the boot cavity to prevent liquid and abrasive materials from entering the boot when the seal is used in a centrifugal pump.

4 Claims, 1 Drawing Figure

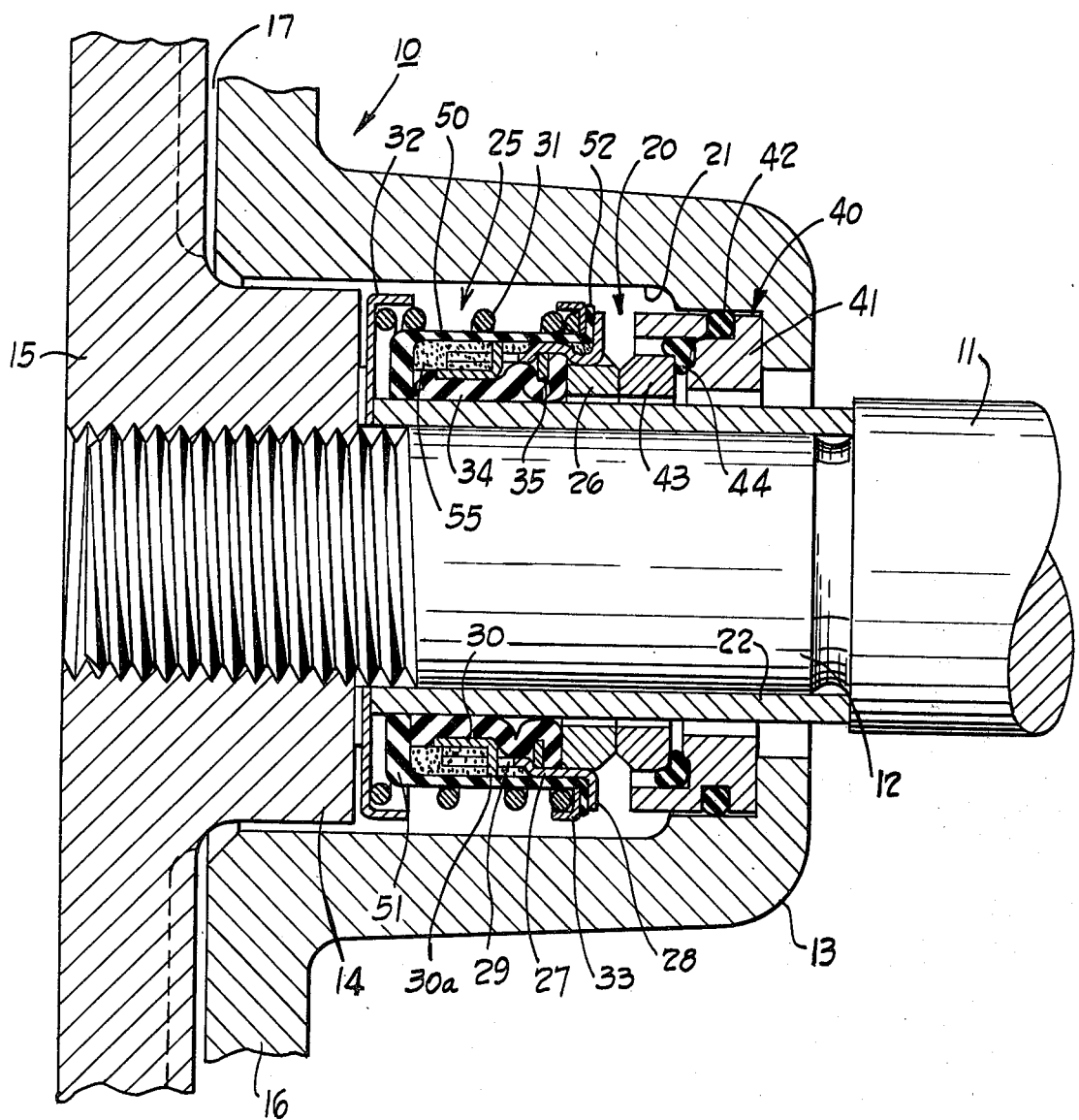

FACE-TYPE SHAFT SEAL

TECHNICAL FIELD

This invention relates generally to rotary mechanical shaft seals, and, more specifically, to an improved face-type shaft seal assembly especially suited for use in centrifugal pumps that handle coherent materials, such as slurries of cement, fly ash and coal, etc., that can pack or cake within the pump.

BACKGROUND ART

A typical face-type shaft seal used in a centrifugal pump comprises an axially movable, rotating seal ring carried on the pump shaft and a seated, non-rotating seal ring which also surrounds the shaft. In normal operation the seal faces of the rings are maintained in engagement by a coil spring that surrounds the shaft and urges the rotating ring toward the seated ring. A flexible sleeve having one end fixed to the shaft and its other end to the rotating ring completes the fluid seal. The flexible sleeve is typically in the form of a bellows that will accommodate axial movement of the rotating ring toward the seated ring.

Centrifugal pumps may be exposed to operational conditions varying from no flow or maximum pressure to a maximum flow, low pressure condition. On either side of the best efficiency point on the pump curve, pressure variations within the pump and seal cavity impose a radial load on the impeller which will produce deflection of the shaft. The resultant shaft deflection and pressure changes tend to separate the seal rings of the shaft seal as described above. When separation occurs, abrasive materials handled by the pump can enter the space between the seal rings and cause extreme wear and total seal failure in a short time. Misalignment of the seal faces caused by deflections of the pump shaft also can result in only partial contact of the seal ring faces and uneven wear. The effectiveness and service life of a shaft seal in a centrifugal pump therefore depends upon the ability of the rotating seal ring to float and maintain contact with the seated ring when shaft deflections and pressure changes occur.

In pumping applications involving slurries or suspensions of coherent materials i.e., materials having cementation characteristics, the solid particles can accumulate within the rotating seal assembly and pack around the flexible sealing sleeve to fill the bellows convolutions. The packed material can ultimately harden into a solid, cemented mass that impairs contraction and elongation of the bellows sealing sleeve which is necessary to provide floating movement of the rotating seal ring. Under these conditions, the floating function of the rotating seal ring may be completely destroyed and the ring will be unable to maintain face contact with the stationary seat ring.

In one prior art arrangement, a protective boot or sleeve has been provided around the coil spring. The difficulty with this prior arrangement is that an increase of pressure in the seal cavity can effectively shorten the protective boot, so as to reduce the spring preload needed to keep the seal rings in engagement. If the spring loading is increased in an attempt to compensate for the counterbalancing effect of shortening the protective boot, the seal rings may be forced together so tightly under normal operating conditions that undue wear results.

DISCLOSURE OF INVENTION

The present invention provides an improved face-type shaft seal adapted for use in centrifugal pumps that handle coherent materials, such as slurries of cement, fly ash and coal, etc., which can cake or harden. A specific object is to provide a shaft seal of the type including a rotatable and axially movable seal ring characterized in that the seal ring is protected against having its floating and sealing function impaired by materials that cake or harden around the seal in a centrifugal pump.

More particularly, the invention is an improvement in a rotary face-type shaft seal of the type including a non-rotating seal face around the shaft, a seal ring which rotates with the shaft and is movable axially into engagement with the seal face, a torque transmitting drive having one part adapted to be fixed to the shaft and an axially movable second part which carries the seal ring, a spring biasing the seal ring toward the seal face, and a flexible sleeve adapted to form a fluid seal between the ring and the shaft. In accordance with the invention, a protective, flexible boot is arranged inside the spring around the assembly of the flexible sleeve and the torque transmitting drive. In an especially preferred embodiment, the boot is filled with a viscous substance to encapsulate the assembly of the torque transmitting drive and the flexible sleeve.

As distinguished from prior art arrangements as described above, the protective boot is inside the spring. When the seal is incorporated in a centrifugal pump, changes of pressure in the seal cavity tending to deform the boot will not affect the preloading of the spring. As a result, the seal ring will be held against the cooperating, non-rotating seal face with the desired amount of pressure necessary to effect a dynamic seal, while avoiding undue wear.

The viscous material that fills the boot serves to prevent the entrance of liquid into the cavity between the boot and the seal sleeve or bellows. The new seal can therefore be employed in pumps that handle suspensions or slurries of coherent material without any danger of the material packing around the seal bellows to impair the floating function of the rotating seal ring. A further advantage of the invention is that the boot can be used with conventional shaft seals without changing the pressure areas of the seal and thereby altering its performance.

Other advantages and a fuller understanding of the invention will be had from the following detailed description when taken in conjunction with the accompanying drawing.

BRIEF DESCRIPTION OF THE DRAWINGS

The drawing is a fragmentary, cross-sectional view of a centrifugal pump embodying the new shaft seal of the invention.

BEST MODE FOR CARRYING OUT THE INVENTION

Referring to the drawing, there is shown a portion of a centrifugal pump 10 which includes a rotatable shaft 11. The shaft 11 has a reduced end portion 12 which extends through the end wall of a seal housing 13 into threaded engagement with a hub 14 of an impeller 15. As illustrated, the housing 13 includes a wall or shroud 16 which confronts and is spaced from the back of the impeller 15. The area 17 between the impeller 15 and the shroud 16 is part of the pump chamber.

The shaft seal of this invention is generally designated by reference number 20 and is mounted in cavity 21 of the seal housing 13 around a sleeve 22. The sleeve 22 is engaged on the reduced end portion 12 of the shaft 11 and forms a part of the shaft.

The face-type shaft seal 20 is comprised of a rotating assembly 25 and a stationary seat 40. In the arrangement shown, the rotating assembly 25 includes a seal ring 26 formed of a suitable abrasion-resistant metal or the like which is rotatable with the shaft 11 and is movable axially toward the seat 40. The seal ring 26 is carried in the open end of a metal sleeve 27 having a radial flange 28 at one end around the ring 26 and axially extending slots 29 in the other end. A metal ring 30 is clamped around the shaft sleeve 22 and has radial tabs 30a that project into the slots 29. The two-part assembly consisting of the members 27, 30 provide a positive mechanical drive for transmitting torque from the shaft 11 to the seal ring 26, while permitting the seal ring to move axially of the shaft. The seal ring 26 is pressed against the seat 40 by the action of a coil spring 31 which is disposed between a retainer ring 32 at one end of the shaft sleeve 22 and a retainer cup 33 adjacent the flange 28. A static, shaft sealing element 34 in the form of a flexible bellows has one end clamped between the shaft sleeve 22 and the ring 30 and its other end clamped between the sealing ring 26 and a clamp ring 35 carried inside the sleeve 27. The bellows 34 is of sufficient length to permit axial movement of the ring 26 toward the seat 40.

As shown, the seat 40 comprises a cup-shaped seat body 41 having its open end facing the rotating assembly 25. The seat body 41 is fitted into the seal housing 13 and is retained in place by an anular, resiliently flexible member 42 that surrounds a portion of the body. The member 42 may be an O-ring or the like mounted in a peripheral groove formed in the seat body. A seal ring 43, which may be an abrasion-resistant metal ring or the like similar to the cooperating seal ring 26, is carried in the open end of the seat body 41. A resiliently flexible member 44, such as an O-ring or the like, is located in the open end of the seat body 41 behind the seal ring 43.

The face seal 20 comprised of the rotatable assembly 25 and the seat 40 is of the type described in U.S. Pat. No. 3,447,810 issued June 3, 1969 and entitled "Shaft Seals", the disclosure of which is incorporated by reference. As disclosed in that patent, the seal ring 26 is pressed against the ring 43 by the loading of the spring 31 in order to form a dynamic fluid seal around the shaft sleeve 22. The effectiveness of this seal depends to a large extent upon the ability of the seal ring 26 to float axially and radially in order to accommodate the deflections of the shaft 11.

In accordance with the present invention, a protective boot 50 formed from a flexible material, such as an elastomer or the like, is arranged around the members 27, 30, 34 inside the spring 31. As shown, the boot 50 is a cup-shaped member having an end wall 51 and a radial flange 52 at its open end. The end wall 51 has a hole through it and fits snugly around the shaft sleeve 22. The flange 52 is clamped between the flange 28 and the retainer member 33.

The inside of the boot 50 is preferable filled with a viscous material 55 in order to encapsulate the members 27, 30. A material suitable for use in filling the boot is a water-resistant, calcium-based grease such as is used as marine lubricant. The grease 55 is essentially non-compressible and would have to be displaced from inside the boot before liquid and abrasives could enter the boot cavity. The snug fit of the boot end wall 51 around the shaft sleeve 22 forms an effective static seal that prevents displacement of the grease.

As will be recognized by those familiar with the art, the pressure in the seal cavity 21 which communicates with pump chamber 17 will vary across the head/capacity curve of the centrifugal pump 10. At one end of the curve, at the shut-off condition of the pump, a positive pressure will exist in the cavity 21 substantially equal to the discharge pressure of the pump. At the other extreme end of the curve, a negative pressure or vacuum may exist in the cavity 21. If the boot 50 were located outside the spring 31, a high pressure condition in the cavity 21 could extrude the boot inwardly of the spring convolutions so as to effectively shorten the boot and counterbalance the spring preloading of the seal ring 26. The location of the boot inside the spring is such that pressure variations in the cavity 21 will have no effect on the spring loading and the seal rings will be maintained in engagement with the desired amount of spring force. The grease 55 or other viscous material effectively prevents the liquid being pumped from entering the boot 50 so that coherent materials carried by the liquid from packing around the members 27, 30, 34 to impair the floating action of the seal ring 26.

Many variations and modifications of the invention will be apparent to those skilled in the art from the following detailed disclosure. Therefore, it is to be understood that, within the scope of the appended claims, the invention can be practiced otherwise than as specifically shown and described.

We claim:

1. In a face-type shaft seal for a rotating shaft including structure providing a non-rotating seal face around the shaft, torque-transmitting drive means having one part adapted to be fixed to the shaft and an axially movable second part, a seal ring carried by said second part of said drive means, spring means biasing said seal ring axially of the shaft into engagement with said non-rotating seal face, and flexible seal means forming a fluid seal between said ring and the shaft and allowing axial movement in said seal ring, the improvement comprising a protective, flexible boot arranged inside said spring means around the assembly of said flexible seal means and said torque transmitting drive means to prevent contaminants from accumulating on said flexible seal means, said boot defining a space between itself and said flexible seal means.

2. The improvement as claimed in claim 1 including a viscous substance filling said boot and encapsulating said assembly.

3. In a centrifugal pump including a seal housing, a rotatable shaft extending through said housing, an impeller connected to said shaft and mounted in a pumping chamber communicating with the inside of such said seal housing, and a face-type shaft seal in said housing including structure providing a non-rotating seal face around said shaft, torque-transmitting drive means having one part fixed to the shaft and an axially movable second part, a seal ring carried by said second part of said drive means, spring means biasing said ring axially of the shaft away from the impeller into engagement with said seal face, and a flexible bellows sleeve forming a fluid seal between said ring and the shaft and allowing axial movement in said ring, the improvement comprising a protective, flexible boot arranged inside said spring means around the assembly of said flexible bellows sleeve and said torque-transmitting drive means, and a viscous, water-resistant, non-compressible material filling the space within said boot around said assembly said boot and said viscous material operative to prevent the accumulation of contaminants on said bellows sleeve.

4. The improvement set forth in claim 3 wherein said flexible boot is cup-shaped and includes an end wall that defines a hole that snugly fits around the shaft whereby a static seal is formed between said boot end wall and said shaft to prevent displacement of said viscous material from said space.

* * * * *